(12) United States Patent
Cunico et al.

(10) Patent No.: US 10,277,537 B2
(45) Date of Patent: *Apr. 30, 2019

(54) PREDICTING AND UPDATING AVAILABILITY STATUS OF A USER

(71) Applicant: International Business Machines Corporation, Armonk, NY (US)

(72) Inventors: Hernan A. Cunico, Holly Springs, NC (US); Asima Silva, Holden, MA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 89 days.

This patent is subject to a terminal disclaimer.

(21) Appl. No.: 15/086,698

(22) Filed: Mar. 31, 2016

(65) Prior Publication Data

US 2016/0241654 A1    Aug. 18, 2016

Related U.S. Application Data

(63) Continuation of application No. 14/623,773, filed on Feb. 17, 2015.

(51) Int. Cl.
*H04L 12/58* (2006.01)
*H04L 29/08* (2006.01)
*H04W 4/12* (2009.01)

(52) U.S. Cl.
CPC ........... *H04L 51/043* (2013.01); *H04L 67/22* (2013.01); *H04L 67/24* (2013.01); *H04W 4/12* (2013.01)

(58) Field of Classification Search
CPC ....... H04L 51/043; H04L 67/22; H04L 67/24; H04W 4/12
USPC ........................................................ 709/204
See application file for complete search history.

(56) References Cited

U.S. PATENT DOCUMENTS

| | | | |
|---|---|---|---|
| 6,580,787 B1 | 6/2003 | Akhteruzzaman et al. | |
| 7,269,627 B2 * | 9/2007 | Knauerhase | H04L 51/04 709/203 |
| 7,787,609 B1 | 8/2010 | Flockhart et al. | |
| 8,060,459 B2 | 11/2011 | Gray | |
| 8,271,631 B1 | 9/2012 | Horvitz et al. | |
| 8,374,590 B1 | 2/2013 | Mikan et al. | |
| 8,473,545 B2 | 6/2013 | McLaughlin | |
| 8,750,472 B2 | 6/2014 | Shun et al. | |
| 9,160,700 B2 | 10/2015 | Kau et al. | |
| 9,838,853 B1 | 12/2017 | Bostick et al. | |
| 2004/0249776 A1 | 12/2004 | Horvitz et al. | |
| 2004/0268265 A1 * | 12/2004 | Berger | G06F 1/1622 715/752 |
| 2005/0228882 A1 * | 10/2005 | Watanabe | H04M 3/42365 709/224 |
| 2006/0069686 A1 | 3/2006 | Beyda et al. | |

(Continued)

OTHER PUBLICATIONS

IBM: List of IBM Patents or Patent Applications Treated as Related, 2 pg.

(Continued)

*Primary Examiner* — James E Springer
(74) *Attorney, Agent, or Firm* — Cuenot, Forsythe & Kim, LLC

(57) ABSTRACT

Predicting and notifying availability status of a user may include determining, using a processor, an availability status of a user according to historical data for the user and automatically updating the availability status of the user using the processor.

7 Claims, 3 Drawing Sheets

(56) References Cited

U.S. PATENT DOCUMENTS

| | | |
|---|---|---|
| 2006/0168073 A1 | 7/2006 | Kogan et al. |
| 2007/0149289 A1 | 6/2007 | Nickell et al. |
| 2007/0220112 A1 | 9/2007 | Knight et al. |
| 2007/0260694 A1 | 11/2007 | Boss et al. |
| 2007/0285502 A1 | 12/2007 | Yee |
| 2007/0299927 A1* | 12/2007 | Knauerhase ............ H04L 51/04 709/206 |
| 2008/0120374 A1 | 5/2008 | Kawa et al. |
| 2008/0162632 A1 | 7/2008 | O'Sullivan et al. |
| 2008/0320082 A1* | 12/2008 | Kuhlke .............. H04L 12/1822 709/205 |
| 2009/0204671 A1 | 8/2009 | Hawkins et al. |
| 2010/0273447 A1* | 10/2010 | Mann ................ H04M 1/72519 455/405 |
| 2011/0044431 A1 | 2/2011 | Klemm |
| 2012/0005221 A1* | 1/2012 | Ickman ............ G06F 17/30528 707/769 |
| 2012/0124146 A1* | 5/2012 | Hsiao ..................... H04L 51/36 709/206 |
| 2012/0135718 A1* | 5/2012 | Amidon ............ H04M 3/42374 455/414.1 |
| 2012/0166242 A1 | 6/2012 | Bentley et al. |
| 2012/0297305 A1 | 11/2012 | Hehmeyer et al. |
| 2012/0316793 A1 | 12/2012 | Jung et al. |
| 2013/0019004 A1 | 1/2013 | Sylvain |
| 2013/0290434 A1* | 10/2013 | Bank ...................... G06Q 10/10 709/206 |
| 2014/0180983 A1 | 6/2014 | Deng et al. |
| 2015/0178626 A1 | 6/2015 | Pielot et al. |
| 2016/0192322 A1 | 6/2016 | Eramian |
| 2016/0241496 A1 | 8/2016 | Cunico et al. |
| 2016/0301974 A1* | 10/2016 | Hough ............... H04N 21/4415 |
| 2017/0109706 A1* | 4/2017 | Sankaran ........... G06Q 10/1095 |

OTHER PUBLICATIONS

Cunico et al., "Predicting and Updating Availability Status of a User," U.S. Appl. No. 14/623,773, filed Feb. 17, 2015, 28 pages.

* cited by examiner

PREDICTING AND UPDATING AVAILABILITY STATUS OF A USER

BACKGROUND

This disclosure relates to predicting the availability status of a user and updating the availability status. In general, an availability status indicates whether a selected user may communicate with one or more other users within a communication system such as a messaging system. Messaging systems typically allow users to set an availability status to one of a plurality of different preset options. Exemplary options often include "available," "away," "busy," "in a meeting," or the like.

In some cases, the user's availability status within the communication system is set manually by the user. In other cases, the user's availability status within the communication system is set automatically. For example, some communication systems access the user's calendar, determine an event the user is scheduled to attend at the present moment, and update the user's availability status to indicate "busy" or "unavailable."

Consider an example where a user is scheduled for back-to-back meetings all day. Using the automated calendar-based approach, the user will have an availability status of "busy" or "in a meeting" for the entire work day. Other persons not involved in one of the user's scheduled meetings needing to communicate with the user are unable to determine when one meeting ends and another meeting begins.

SUMMARY

A method includes determining, using a processor, an availability status of a user according to historical data for the user and automatically updating, using the processor, the availability status of the user.

DETAILED DESCRIPTION

While the disclosure concludes with claims defining novel features, it is believed that the various features described herein will be better understood from a consideration of the description in conjunction with the drawings. The process (es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to predicting an availability status of a user and updating the availability status. In accordance with the inventive arrangements described herein, an availability status of a user may be determined using contextual data. The availability status may be updated automatically. Further, one or more actions may be taken responsive to determining the availability status. For example, a system may enforce a predicted availability status for a user as applied to incoming communications.

In one example, the availability status that is determined may be a current availability status. In another example, the availability status may be a future availability status, i.e., a predicted availability status for a time in the future. An estimate of when a current availability status will change to the future availability status may also be determined. The determined availability status, whether current or future, may be updated automatically.

In another example, the availability status that is determined may be a partial availability status. A current availability status and/or a future availability status each may be a partial availability status. In general, a partial availability status indicates whether a selected user, though participating in an event, is available to interact during the event with another user that may not be participating in the event.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Figure 1:
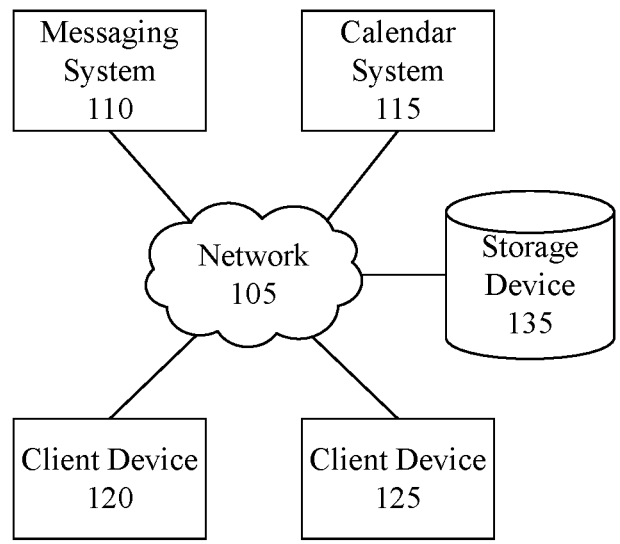
FIG. 1 is a block diagram illustrating an exemplary network system.

FIG. 1 is a block diagram illustrating an exemplary network system 100. Network system 100 is a network of one or more systems such as computers, communication devices, and the like, in which the illustrative embodiments may be implemented. Network system 100 may include a network 105, a messaging system 110, a calendar system 115, one or more client devices 125 and 130, and optionally a storage device 135.

Network 105 is the medium used to provide communication links between various devices and data processing systems connected together within network system 100. Network 105 may include connections such as wire, wireless communication links, fiber optic cables, and the like. Network 105 may be implemented as, or include, any of a variety of different communication technologies such as an intranet, a local area network (LAN), a wide area network (WAN), a wireless network, a mobile network, a Virtual Private Network (VPN), the Internet, the Public Switched Telephone Network (PSTN), or the like.

As pictured in FIG. 1, messaging system 110, calendar system 115, client devices 120, 125, and storage device 135 are coupled to network 105. In one example, messaging system 110 and calendar system 115 each may be implemented as a computer system such as a server or one or more networked computer systems or servers. Client devices 120 and 125 may be implemented as data processing systems such as computers, tablet computers, mobile communication devices, handheld communication devices, or the like. Storage device 135 may be a network accessible storage device such as a server or a network attached storage device.

In one example, messaging system 110 may be implemented as an instant messaging system, a texting system, a chat system, or the like. Messaging system 110 may be programmed to determine availability status for one or more users and automatically update the availability status for the user(s). For example, messaging system 110 may determine availability status, e.g., a predicted availability status, for a user of client device 120. The availability status may be updated automatically within messaging system 110. For example, the availability status may be provided to client device 125, to calendar system 115, and/or to storage device 135. In another example, client device 120 may be programmed to determine availability status for a user (of client device 120) and provide the availability status to another device such as messaging system 110, calendar system 115, storage device 135, and/or client device 125.

An availability status for a user may be determined from contextual data for the user. For purposes of illustration, the availability status that is determined may be for a user of client device 120. Contextual data for the user of client device 120 may be stored within messaging system 110, calendar system 115, storage device 135, and/or client device 120. In one aspect, contextual data may include historical data for the user of client device 120. In another aspect, contextual data may include real time data for the user of client device 120. In still another aspect, contextual data may include calendar data for the user of client device 120.

FIG. 1 is provided for purposes of illustration and is not intended to limit the inventive arrangements described within this disclosure. For example, network system 100 may include additional networked data processing systems, fewer data processing systems, additional networked client devices, fewer client devices, and/or other devices not shown.

Figure 2:
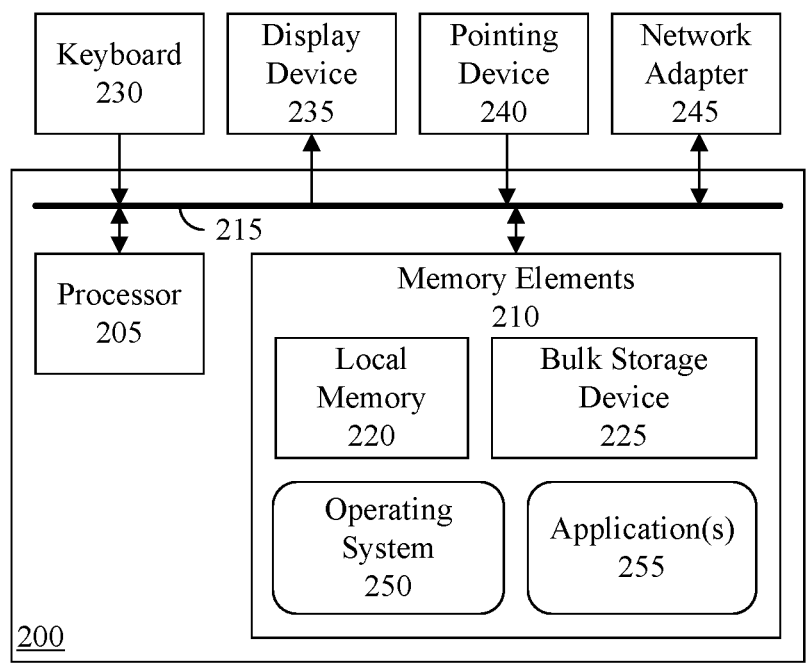
FIG. 2 is a block diagram illustrating an exemplary architecture for a data processing system.

FIG. 2 is a block diagram illustrating an exemplary architecture 200 for a data processing system. Architecture 200 may include at least one processor 205 coupled to memory elements 210 through a system bus 215 or other suitable circuitry. As such, architecture 200 may store program code within memory elements 210. Processor 205 executes the program code accessed from memory elements 210 via system bus 215 or the other suitable circuitry.

Memory elements 210 include one or more physical memory devices such as, for example, local memory 220 and one or more bulk storage devices 225. Local memory 220 refers to random access memory (RAM) or other non-persistent memory device(s) generally used during actual execution of the program code. Bulk storage device(s) 225 may be implemented as a hard disk drive (HDD), solid state drive (SSD), or other persistent data storage device. Architecture 200 may also include one or more cache memories (not shown) that provide temporary storage of at least some program code in order to reduce the number of times program code must be retrieved from bulk storage device 225 during execution.

Input/output (I/O) devices such as a keyboard 230, a display device 235, and a pointing device 240 may optionally be coupled to architecture 200. The I/O devices may be coupled to architecture 200 either directly or through intervening I/O controllers. In some cases, one or more of the I/O devices may be combined as in the case where a touchscreen is used as display device 235. In that case, display device 235 may also implement keyboard 230 and pointing device 240. One or more network adapters 245 may also be coupled to architecture 200 to enable architecture 200 to become coupled to other systems, computer systems, remote printers, and/or remote storage devices through intervening private or public networks. Modems, cable modems, wireless transceivers, wireless radios, and Ethernet cards are examples of different types of network adapters 245 that may be used with architecture 200.

As pictured in FIG. 2, memory elements 210 may store an operating system 250 and one or more applications 255. Application 255, being implemented in the form of executable program code, is executed by architecture 200 and, as such, may be considered an integrated part of architecture 200. Application 255 and/or operating system 250, including any parameters and/or attributes utilized by application 255 and/or operating system 250, are functional data structures that impart functionality when employed as part of a system utilizing architecture 200. In one exemplary implementation, application 255 may implement an availability status prediction system.

In one aspect, architecture 200 may be used to implement a computer, a programmable data processing apparatus that is suitable for storing and/or executing program code, and/or a communication device. Further, architecture 200 may be implemented in any of a variety of different form factors including, but not limited to, a portable device such as a mobile or handheld communication device, a tablet computing device, a laptop computing device, a desktop computing device, a server, or the like. For example, messaging system 110 and/or calendar system 115 of FIG. 1 may be implemented using architecture 200. Similarly, client device 120 and/or client device 125 may be implemented using architecture 200.

Figure 3:
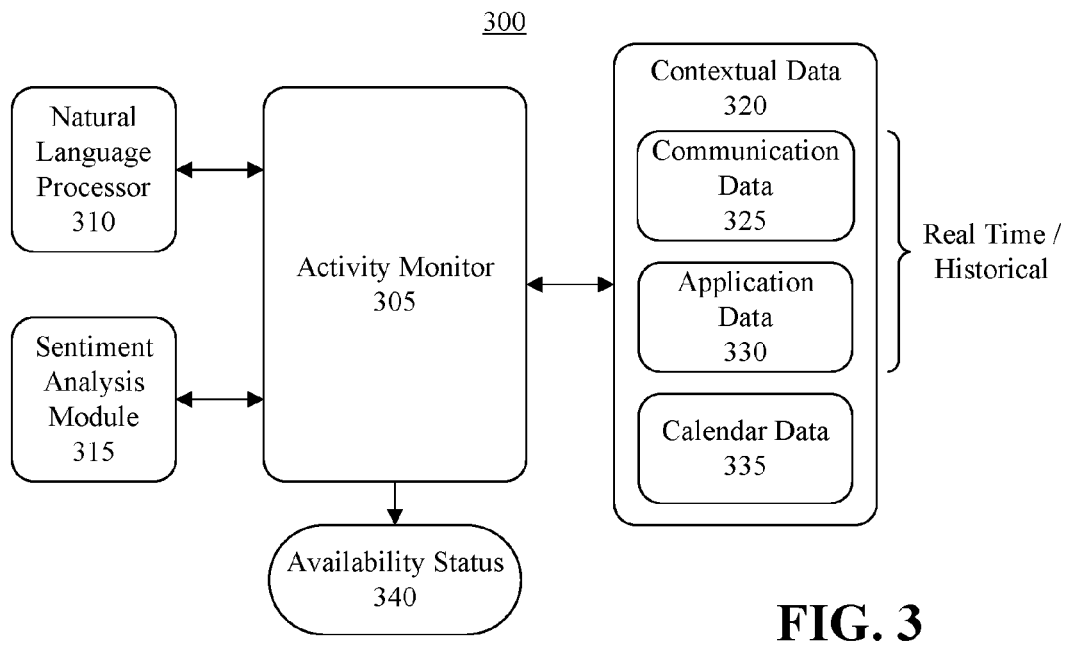
FIG. 3 is a block diagram illustrating an exemplary implementation of an availability status prediction system.

FIG. 3 is a block diagram illustrating an exemplary implementation of an availability status prediction system (system) 300. System 300 is representative of a software architecture that may be implemented within a data processing system or a plurality of networked data processing systems. In illustration, system 300 may be implemented as one or more of applications 255 executing within architecture 200 described with reference to FIG. 2. In one example, system 300 may be implemented within a client device. In another example, system 300 may be implemented within a server such as messaging system 110. In another exemplary implementation, system 300 may be implemented in a separate data processing system that may provide availability status for users to other systems such as a messaging system and/or client devices.

System 300 may include an activity monitor 305, a natural language processor (NLP) 310, and a sentiment analysis module 315. Activity monitor 305 may access contextual data 320. Contextual data 320 may include communication data 325, application data 330, and/or calendar data 335. Communication data 325 and/or application data 330 may include real time data that is received by system 300. Communication data 325 and/or application data 330 also may include historical data.

Communication data 325 may include any communications sent or received by the client device of a user for which an availability status is being determined (hereafter the "selected user"), the times of the communications as sent and/or received, the recipients of the communications, etc. Exemplary communications may include instant messages, text messages, chats, phone calls, electronic mails, or the like. Application data 330 may specify applications and/or processes being executed or resident in program execution memory within a client device of the selected user. In one aspect, the particular applications and/or processes may be filtered or limited to those specifically initiated or executed by user request. Calendar data 335 may specify particular events on the selected user's calendar, the start and end times of the events, the dates of the events, and/or event participant data. The event participant data may include the participants of the events, event role data for participants of the events, and organizational role data for participants of the events.

As defined herein, the term "event" may mean a scheduled meeting, a scheduled appointment, a task assigned to a particular date and/or time, etc. In this regard, an event may include a teleconference, a phone call with another user, a Web-based conference, or other event. As defined herein, the term "event role data" means one or more attributes specifying the role of a participant within an event. The event role data may be for one or more or all participants of an event, including the selected user. The parameters of the event role data may include, but are not limited to, whether the participant is mandatory, optional, an organizer, a presenter, etc. The event role data may change while the event is taking place. For example, a user, including the selected user, may not be a presenter for an event initially, may become a presenter for a period of time during the event, and then no longer be considered a presenter for the event.

As defined herein, the term "organizational role data" means one or more attributes specifying the role of a participant within an organization. As noted, a participant may include the selected user. The parameters of organizational role data may include a job title such as vice president, chief operating officer, manager, engineer, or other information for the participant such as may be obtained from an organizational chart or personnel directory of the organization.

Activity monitor 305 may provide communication data 325, application data 330, and/or calendar data 335 to NLP 310 and/or sentiment analysis module 315. The resulting analysis from NLP 310 and/or sentiment analysis module 315 may be provided back to activity monitor 305. Activity monitor 305 may determine an availability status 340 for the selected user. Availability status 340 may be determined using the semantic analysis performed by NLP 310, the sentiment analysis performed by sentiment analysis module 315, and/or other processing techniques such as pattern analysis or the like as implemented within by activity monitor 305.

Availability status 340 is a prediction of the availability status of the user. Availability status 340 may be a current availability status, a future availability status, and/or a partial availability status. A current availability status is a predicted availability status for the selected user at the present moment. A future availability status is a predicted availability status for the selected user at a designated time in the future. It should be appreciated that a current availability status and a future availability status each may or may not be a partial availability status independently of the other. Further, when determining a future availability status, activity monitor 305 may determine an estimate of the time when the future availability status is to take effect.

As defined herein, the term "partial availability status" means an availability status where the selected user is, at the time associated with the partial availability status, e.g., current or future, engaged or participating in an activity such as an event and is also available to interact with a different user through a communication channel. As an example, a user may be attending an event such as a Web-meeting, but be able to interact with one or more other users through electronic mail, instant messaging, or the like.

As defined within this disclosure, the term "communication channel" means a particular logical connection and/or a particular communication protocol. Exemplary communication channels include, but are not limited to, electronic mail, chat, instant messaging, Web conference, teleconference, telephone call, etc.

Figure 4:
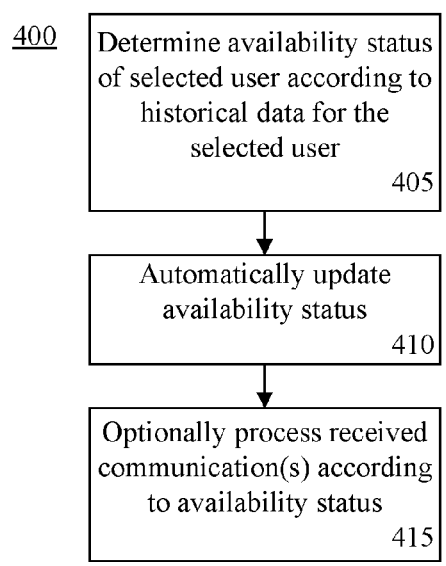
FIG. 4 is a flow chart illustrating an exemplary method of predicting an availability status of a user.

FIG. 4 is a flow chart illustrating an exemplary method 400 of predicting an availability status of a user. Method 400 may be performed by a system as described herein. For example, method 400 may be implemented by a server such as a messaging system, an independent availability status prediction system, a client device, or the like. For ease of description and clarity, the term "system" is used to refer to the particular machine(s) or device(s) implementing method 400.

In block 405, the system determines an availability status for a selected user. The availability status may be determined using historical data for the selected user. The historical data may include application data and/or communication data. In another aspect, the system may determine availability status using real time data for the selected user. The real time data may include application data and/or communication data. In still another aspect, the system may determine an availability status using calendar data for the selected user. It should be appreciated that the system may use historical data, communication data, and/or calendar data for the selected user. In one aspect, the availability status is a current availability status for the selected user. In another aspect, the availability status is a future availability status for the selected user. In still another aspect, the availability status is a partial availability status for the selected user.

In block 410, the system automatically updates the availability status of the selected user. In one aspect, automatically updating the availability status of the selected user may include providing the availability status to a device. For example the system may provide the availability status of the user to a different client device, to a server or other system, etc.

In block 415, the system optionally processes communications directed to the selected user over one or more communication channels according to the availability status determined in block 405. The system, for example, may enforce the availability status by accept and/or rejecting an incoming communication in accordance with the determined availability status.

For example, responsive to determining that the availability status of the user is unavailable, a communication such as an instant message directed to the selected may be rejected, e.g., not delivered. In another example, the system may reject an incoming communication from any user not participating in an event in which the selected user is currently participating. In still another example, the system may allow an incoming communication responsive to determining that the selected user is partially available.

Figure 5:
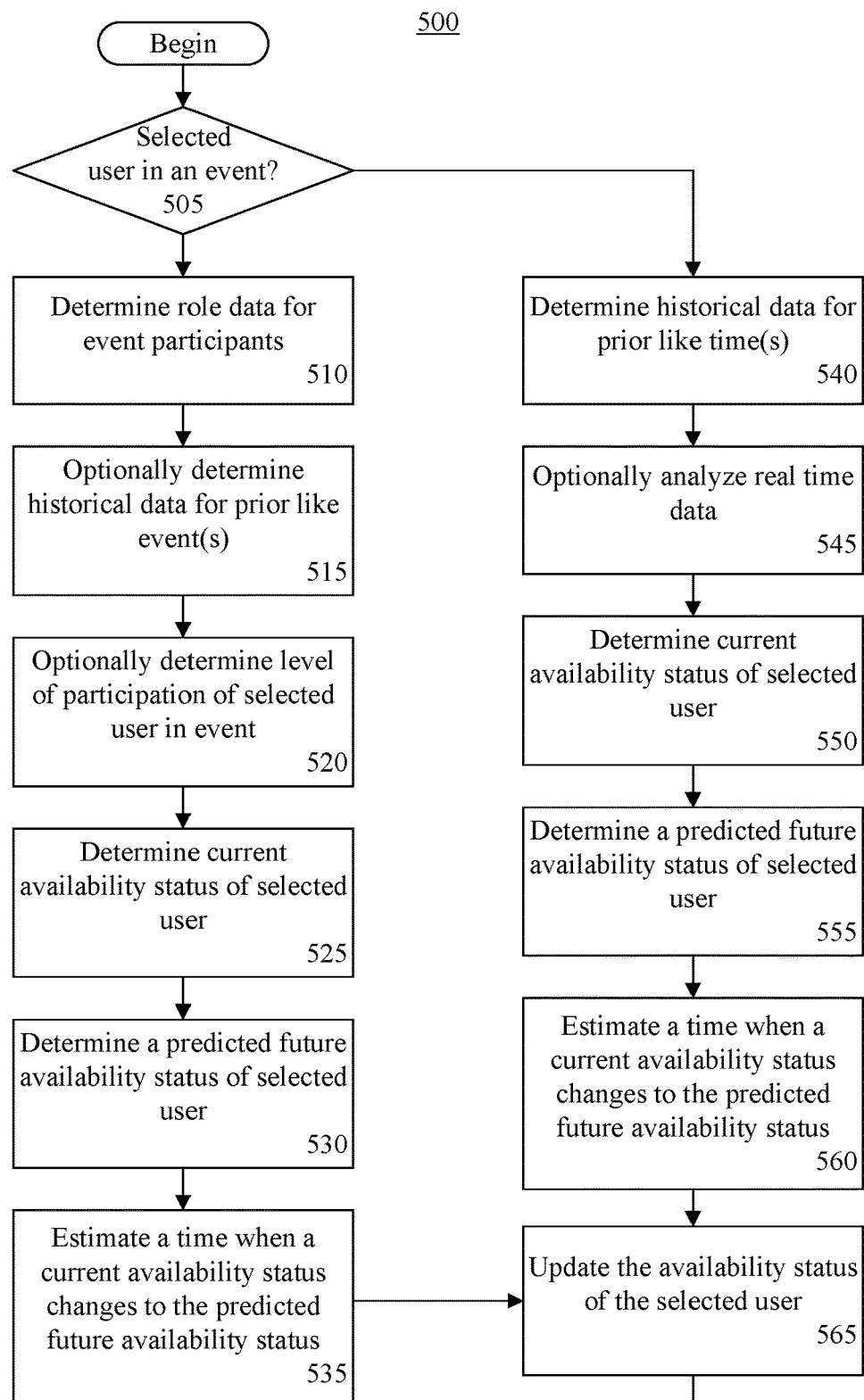
FIG. 5 is a flow chart illustrating another exemplary method of predicting an availability status of a user.

FIG. 5 is a flow chart illustrating another exemplary method 500 of predicting an availability status of a selected user. Method 500 may be performed by a system as described herein. For example, method 500 may be implemented by a server such as a messaging system, an independent availability status prediction system, a client device, or the like. For ease of description and clarity, the term "system" is used to refer to the particular machine(s) or device(s) implementing method 500.

In block 505, the system may determine whether a selected user currently participating in an event. For example, the system may determine whether the selected user's calendar data indicates that an event, involving the selected user, is scheduled and in progress. If so, method 500 may proceed to block 510. If not, method 500 may continue to block 540.

In block 510, the system may determine event participant data for the event. The event participant data may include, as noted, role information for event participants in reference to event role data and/or organization role data. The system, for example, may determine event role data and/or organizational role data, the number of attendees of the event, and the like.

In block 515, the system may optionally determine historical data for the selected user. The historical data may include other prior like events, e.g., particularly if the event is recurring, user activities determined from stored application data and/or communication data from the prior similar times or events, e.g., data collected during a same time frame as the event in a prior week, month, date, during a prior recurring instance of the event, etc. The historical data may include the selected users prior event role data for prior like events.

In block 520, the system optionally determines whether the selected user is an active participant in the event. If an active participant, the system may determine that the selected user is not partially available. If not an active participant, the system may determine that the selected user is partially available.

In one aspect, the system may determine a level of participation of the selected user in the event. In illustration, the system may determine the level of participation based upon real time data such as real time communication data and/or real time application data and whether the real time data relates to the event currently in progress. For example, the system may determine whether a detected computing activity such as a chat or an active program, from the real time communication data and/or real time application data, on the client device of the selected user during the event is related to the event. Responsive to detecting one or more activities that are unrelated to the event, the system may determine that the user is not an active participant in the event.

The level of participation may be a binary value indicating either actively participating or not actively participating. For example, responsive to detecting any one of a plurality of indicators of non-participation, the system may set the level of participation of the selected user to indicate that the user is not actively participating in the event.

In another example, the level of participation may be a non-binary numeric value that may be compared to a threshold. The scoring may be inverted where high scores indicate non-participation and lower scores indicate active participation. For example, activities determined to be indicators that the selected user is not actively participating in the event may be assigned values, summed, and compared to the threshold. Accordingly, a level of participation below the threshold indicates that the user is actively participating in the event. A level of participation at or above the threshold indicates that the user is not actively participating in the event.

Exemplary indicators that the selected user is not actively participating in an event may include, but are not limited to, analyzing the content of messages exchanged during the event and determining that the communications are unrelated to the event, determining that the users with whom the selected user is communicating are not participants of the event, determining that the selected user is in a listen and/or observe only mode, and the like. The system may determine whether one or more other real time activities of the selected user relate to the subject matter of the event and, if so, are not indicators that the user is not an active participant. The determination may be made, at least in part, through application of natural language processing, sentiment analysis, rules, etc.

In block 525, the system may determine a current availability status of the selected user. The current availability status may be determined according to information and/or processing performed in block(s) 505, 510, 515, and/or 520. In one aspect, the current availability status may be, or indicate, partial availability.

In block 530, the system may determine a future availability status of the selected user. The future availability status of the selected user may be determined according to information and/or processing performed in block(s) 505, 510, 515, and/or 520. The predicted future availability status may be, or indicate, partial availability status. In block 535, the system may estimate a time when the current availability status changes to predicted future availability status.

Referring back to block 540, the system may determine historical data for one or more prior like times. For example, since the selected user is not participating in an event currently in progress, the system may evaluate activities of the user for prior like times such as a same period of time for one or more prior weeks, quarter, days, etc. The system may evaluate communication data and/or application data from the prior, similar periods of time.

In block 545, the system may optionally analyze real time data. In block 550, the system may determine a current availability status of the selected user. The current availability status may be determined according to information and/or processing performed in block(s) 505, 540, and/or 545. In one aspect, the current availability status may be, or indicate, partial availability status, for example, as determined from the availability indicators.

In block 555, the system may determine a future availability status of the selected user. The predicted future availability status of the selected user may be determined according to information and/or processing performed in 505, 540, and/or 545. The predicted future availability status may be, or indicate, partial availability status. In block 560, the system may estimate a time when the current availability status changes to the future availability status.

In block 565, the system may automatically update the availability status of the sele cted user to indicate the current availability status determined in block 525 and/or block 550 as the case may be. The system may also update the availability status of the selected user to include the predicted future availability status of the selected user as determined in block 530 or block 555. The system further may automatically update the availability status of the selected user to indicate the estimated time of when the availability status of the selected user changes from the current availability status to the predicted future availability status determined in block 535 or 560.

As discussed, the system further may enforce the availability status that is determined. While the user is unavailable, communications may be rejected. While the availability status indicates partially availability, communications may be accepted in accordance with any rules defined for the partial availability status, etc.

Having described exemplary system implementations and methods of operation, several exemplary use cases are presented below.

In a first exemplary use case, the system may determine that the selected user is currently in a meeting that is scheduled to end in 10 minutes. Further, the system may determine that although the selected user is in a meeting, the selected user is able to participate in a chat or instant messaging session. The system may determine that the selected user is able to chat responsive to determining one or more or all of the following conditions: event role data indicating that the user is not mandatory and/or is currently in listen only mode, is involved in one or more other communications with non-participant users where the subject matter of the communications is determined to be unrelated to the event currently in progress, or the like.

The system may automatically update the availability status of the selected user to specify "In a meeting, but can chat, available in 10 minutes." The availability status indicates a current availability status of "In a meeting," a predicted future availability status of "available," and an estimated time of when the current availability status will change to the predicted future availability status. Further, the current availability status indicates a partial availability as "but can chat".

In another example, the system may determine that the selected user is unavailable while participating in the event. For example, the system may determine the selected user is unavailable responsive to determining that the selected user is mandatory for the event, that a participant of the event is designated as an important user, e.g., a supervisor of the selected user or other user such as a vice president, etc., that the selected user is engaged in a chat or instant messaging session that relates to the event currently in progress, and/or that the selected user is communicating with other participants of the event.

In another exemplary use case, the system may be configurable to look ahead at the selected user's calendar data in predetermined amounts of time. The predetermined amounts of time may be 5 minutes, 10 minutes, 15 minutes, 20 minutes, 30 minutes, or the like. The selected user or an administrator, for example, may be able to specify the particular amount of time that the system looks ahead into the calendar data for the selected user. In that case, the system may provide a current availability status and a future availability status based upon the events detected within the next designated amount of time.

In another example, the system may evaluate historical data. For example, the system may determine the next period of time, e.g., 20 minutes. The system may evaluate historical data for the same period of time in prior days, weeks, or months to determine whether the user regularly communicates during this time. Such communications may indicate that the user does participate in an event, but that the event is not listed in the calendar data for the selected user. Accordingly, the system may indicate a current availability status and indicate that the user will not be available or only partially available in 20 minutes or the determined amount of time to when the user, in the past, has regularly performed particular activities.

In another exemplary use case, the system may analyze event patterns of the selected user. The system may determine which meetings are regularly scheduled according to the calendar data, which meetings are not regularly scheduled, e.g., are "one-off meetings," and a level of involvement of the selected user in the meetings. Level of involvement may be determined according to the event role data for the selected user, the organizational role data for the event, and/or real time data.

For example, a level of multitasking by the user, as determined through the user's client device from communication data and application data collected from prior regularly scheduled and/or like events and/or using real time data in a meeting currently in progress may be used to indicate whether the user is at least partially available. Like events may be determined by the system responsive to finding prior events with a same or similar title, prior events associated with a same project, prior events having the same or similar participants, and/or prior meetings taking place in a same period of time, day of the month or week, etc. Multitasking unrelated to the subject matter of the event is indicative that the selected user is partially available.

In other examples, user attention tracking systems, as are known in the art, may be used alone or in combination with other techniques described herein to determine a level of participation in the event.

In another exemplary use case, the system may determine that the selected user has an availability status of "In a meeting, time remaining 10 minutes." In another example, the system may determine that the selected user has an availability status of "available, joining a meeting in 5 minutes." For instance, the user is not currently scheduled for an event, but has an event scheduled in 10 minutes. Any user that looks up the status of the selected user is immediately informed that the selected user has only 10 minutes to communicate.

In yet another exemplary use case, the selected user may have back-to-back meetings scheduled all day. In the event that another user must contact the selected user, the user may look-up the availability status of the selected user. The availability status of the selected user may be, for example, "In a meeting, time remaining 2 hours. Might be able to respond in 20 minutes." The system automatically updates the availability status of the selected user according to calendar data and also predicts partial availability of the user in 20 minutes. For example, the system may determine that the selected user is on a call and/or Web conference, i.e., the event, and also knows that the selected user's next scheduled event is a listen only conference call, thereby allowing the system to determine that the selected user is at least partially available during the next scheduled event.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. Notwithstanding, several definitions that apply throughout this document now will be presented.

As used herein, the singular forms "a," "an," and "the" are intended to include the plural forms as well, unless the context clearly indicates otherwise.

The term "another," as used herein, is defined as at least a second or more.

As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system.

The terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]," depending on the context.

The terms "one embodiment," "an embodiment," or similar language mean that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

As defined herein, the term "output" means storing in memory elements, writing to a display or other peripheral output device, sending or transmitting to another system, exporting, or the like.

The term "plurality," as used herein, is defined as two or more than two.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "real time" means a level of processing responsiveness that a user or system senses as sufficiently immediate for a particular process or determination to be made, or that enables the processor to keep up with some external process.

As defined herein, the term "responsive to" and variations thereof mean responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "user" means a human being.

It will also be understood that, although the terms first, second, etc. may be used herein to describe various elements, these elements should not be limited by these terms, as these terms are only used to distinguish one element from another unless stated otherwise or the context indicates otherwise.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   determining, using a processor, a partial availability status of a user during an event according to a level of participation of the user in the event, the partial availability status indicating whether the user, at a time associated with the partial availability status, is available to interact with a different user through at least one electronic communication channel not being used for the event, determining the level of participation of the user in the event comprising determining whether communications sent or received by a client device of the user during the event relates to the event by performing natural language processing and semantic analysis on the communications sent or received by the client device of the user; and
   automatically updating, using the processor, an availability status of the user based on the determined partial availability status of the user;
   receiving a first incoming communication through the at least one electronic communication channel not being used for the event; and
   responsive to the partial availability status indicating that the user is engaged in the event but not an active participant in the event, wherein whether the user is an active participant in the event is determined by comparing the level of participation of the user in the event to a threshold, and responsive to receiving the first incoming communication through the at least one electronic communication channel not being used for the event, accepting the first incoming communication.

2. The method of claim 1, wherein the availability status of the user comprises a predicted future availability status, the method further comprising:
   based on historical data for the user, estimating a time when a current availability status of the user changes to the predicted future availability status;
   wherein automatically updating the availability status of the user further comprises updating the availability status to specify the predicted future availability status and the estimated time.

3. The method of claim 2, wherein the future availability status comprises the partial availability status.

4. The method of 1, further comprising:
   determining the partial availability status according to whether a detected computing activity on a client device of the user during the event is related to the event.

5. The method of claim 1, wherein while the user is participating in an event, the partial availability status further is determined according to participant data for the event.

6. A method comprising:
   determining, using a processor, a partial availability status of a user during an event according to a level of participation of the user in the event, the partial availability status indicating whether the user, at a time associated with the partial availability status, is available to interact with a different user through at least one electronic communication channel not being used for the event, determining the level of participation of the user in the event comprising determining whether communications sent or received by a client device of the user during the event relates to the event by performing natural language processing and semantic analysis on the communications sent or received by the client device of the user, and
   automatically updating, using the processor, an availability status of the user based on the determined partial availability status of the user;
   receiving a first incoming communication through the at least one electronic communication channel not being used for the event, wherein the first incoming communication is from a second user participating in the event;

responsive to the partial availability status indicating that the user is engaged in the event but not an active participant in the event and receiving the first incoming communication through the at least one electronic communication channel not being used for the event, accepting the first incoming communication;

receiving, from a third user not participating in the event, a second incoming communication through the at least one communication channel not being used for the event; and responsive to receiving the second incoming communication through the at least one communication channel not being used for the event, rejecting the second incoming communication from the third user not participating in an event in which the user currently is participating, rejecting the second communication comprising not delivering the second communication to the user.

7. The method of claim 6, wherein the communication is an instant message.

* * * * *